US007674311B2

(12) United States Patent
Gross et al.

(10) Patent No.: US 7,674,311 B2
(45) Date of Patent: Mar. 9, 2010

(54) NITROGEN EXTRACTION FROM ORGANIC WASTES FOR FERTIGATION IN ORGANIC AGRICULTURE

(75) Inventors: Amit Gross, Midreshet Ben-Gurion (IL); Ali Nejidat, Beer Sheva (IL); Pinchas Fine, Kochav Yair (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 594 days.

(21) Appl. No.: 11/593,948

(22) Filed: Nov. 7, 2006

(65) Prior Publication Data

US 2007/0101783 A1 May 10, 2007

Related U.S. Application Data

(60) Provisional application No. 60/735,171, filed on Nov. 10, 2005.

(51) Int. Cl.
*C05F 3/00* (2006.01)
(52) U.S. Cl. .................. 71/21; 71/11; 71/12; 71/15; 71/54; 71/58; 71/64.1
(58) Field of Classification Search ............... 71/11–27, 71/31–38, 54, 58, 64.1
See application file for complete search history.

(56) References Cited

U.S. PATENT DOCUMENTS 1,319,663 A * 10/1919 Davis et al ................ 423/359
2,745,815 A * 5/1956 Mussell ..................... 523/132
4,069,033 A * 1/1978 Baldassari ................... 71/25
4,710,300 A * 12/1987 Kristoufek ................ 210/603
5,266,201 A * 11/1993 Letourneux et al. ........ 210/620
5,928,403 A * 7/1999 Moore, Jr. .................. 71/21
6,656,382 B1 * 12/2003 Kuhlmann et al. ......... 252/184
2003/0172697 A1 * 9/2003 Sower ........................ 71/11
2006/0039847 A1 * 2/2006 Kaboord et al. ........... 423/359

OTHER PUBLICATIONS

Yekutieli et al.: The field 76 (1996) 85-88 . . . .
Welke S.: Effectiveness of compost teas extracts as disease suppressants in fresh market crops. Information bulletin 9 (2001) 16-20.
Hadas A. The field 77 (1997) 18-20 . . . .
Hadas A et al.: The field 71 (1991) 1539-44 . . . .
Hadas A. & Rosenberg R.: Fert. Res. 31 (1992) 209-14.

* cited by examiner

*Primary Examiner*—Wayne Langel
(74) *Attorney, Agent, or Firm*—Roach Brown McCarthy & Gruber, P.C.; Kevin D. McCarthy

(57) ABSTRACT

A method is provided for manufacturing a liquid nitrogen fertilizer from organic wastes and manures, in which nitrogen is extracted as an aqueous ammonia, and further concentrated, and eventually converted to nitrate in a biological reactor. The method may utilize nitrogen rich organic wastes and manures, such as wastewater sludge, slaughter house wastes, broiler layer, and guano, and it is especially suitable for providing a nitrogen fertilizer in organic farming.

20 Claims, 6 Drawing Sheets

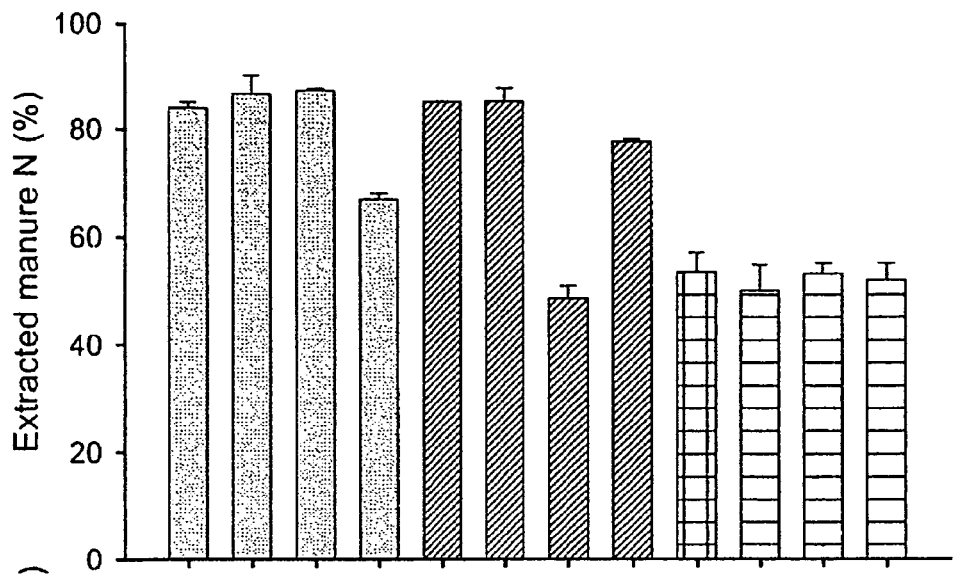
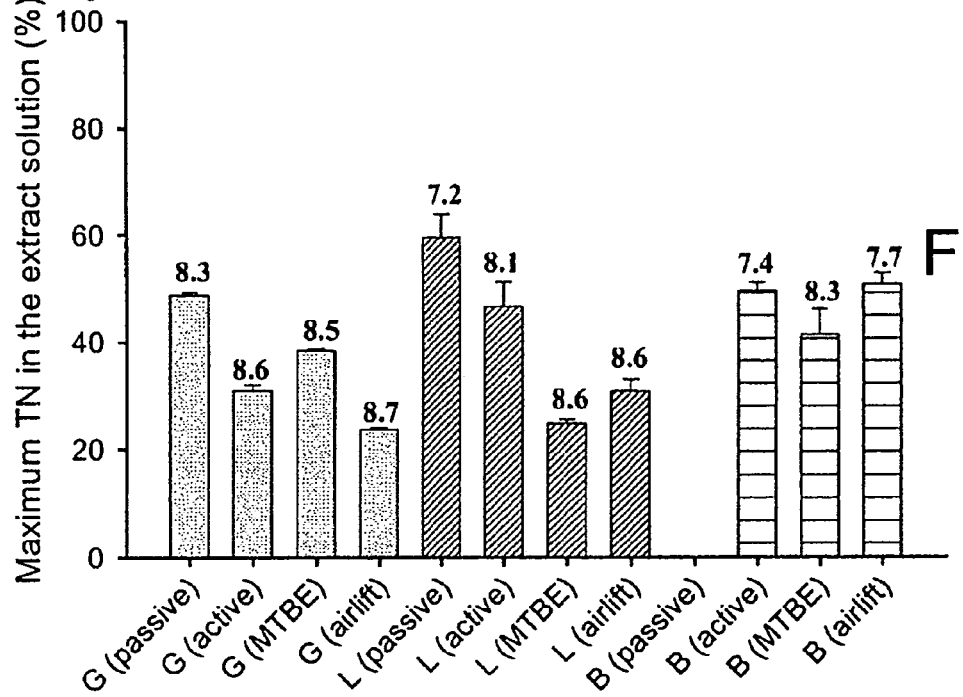
Fig. 4A
Fig. 4B

TABLE 1. REPRESENTATIVE NITROGEN VALUES OF GUANO, LAYER AND BROILER MANURES. DATA ARE IN GRAMS PER KG (UNLESS STATED DIFFERENTLY). RESULTS ARE BASED ON NINE REPLICATES

|  | Guano | Layer | Broiler |
|---|---|---|---|
| Total N | 175 | 34 | 48 |
| $NH_4^+$-N | 24 | 1.5 | 3 |
| $NO_2^-$-N | <0.018 | <0.023 | <0.020 |
| $NO_3^-$-N | <0.08 | <1.83 | <0.08 |
| Uric acid-N (UA) | 94 | 5 | 19 |
| Organic-N (ON) includes UA-N | 151 | 30 | 45 |
| UA-N/ON (%) | 61.8 | 17.5 | 41.4 |
| C/N | 0.6 | 5.6 | 6.6 |
| Cost of available N (US $) | 10,367 | 1,029 | 926 |

TABLE 2. REPRESENTATIVE CONCENTRATIONS OF TOTAL SUSPENDED SOLIDS (TSS), TOTAL PHOSPHOROUS (TP), POTASSIUM (K), ORGANIC CARBON (OC) AND APPEARANCE OF PATHOGENS IN THE EXTRACT SOLUTION. RESULTS ARE BASED ON THREE REPLICATES

|  | TSS (mg/L) | TP (mg/L) | K (mg/L) | OC (mg/L) | *Pathogens (n=10/manure) |
|---|---|---|---|---|---|
| Guano | 10,000 | 900 | 1,500 | 3,600 | + |
| Layers | 10,000 | 40 | 1,570 | 3,000 | + |
| Broilers | 25,000 | 35 | 800 | 6,000 | + |

* "+" - Presence of pathogens in the extract solution after 10 d of extraction.

Fig. 7

NITROGEN EXTRACTION FROM ORGANIC WASTES FOR FERTIGATION IN ORGANIC AGRICULTURE

The present invention claims priority to U.S. provisional patent application Ser. No. 60/735,171, filed on Nov. 10, 2005.

FIELD OF THE INVENTION

The present invention relates to a method of manufacturing a liquid nitrogen fertilizer for organic farming from nitrogen (N) rich organic wastes (for example wastewater sludge, slurry from slaughter houses, etc.) and fowl manures (for example guano, layer, broiler manure, etc.). The waste or manure is being extracted in water, obtaining an aqueous ammonia which is then volatilized, and eventually oxidized to nitrate.

BACKGROUND OF THE INVENTION

As more people consider organic products to be healthier, the practice of organic agriculture is expanding worldwide, accompanied by their high economic potential and environmentally sound practices. In organic farming, where the use of chemicals is prohibited, composts and fowl manures serve as fertilizers, mainly as a nitrogen (N) source. Supplementary N side dressing is needed in organic cropping systems when the available N from soils and composted manures applied annually is inadequate to meet crop requirements. Such conditions prevail in soils that have recently been converted to organic farming or in high-N demanding crops. In Israel, for example, the intensive growth of most organic crops in greenhouses is based on exploitation of composts prior to planting, and application of organic N during the growing season via the irrigation system (fertigation), particularly in drip irrigation. This practice allows uniform spreading of the N and reduces labor expenses connected with fertilizing operations [Yekutieli et al.: The field 76 (1996) 85-88]. Manure extracts have also been suggested as organic treatments against plant diseases [see, e.g., Welke S.: Effectiveness of compost teas extracts as disease suppressants in fresh market crops. Information bulletin 9 (2001) 16-20]. A major organic N source is guano, a natural deposit of the excrements and remains of birds living along ocean coasts and feeding on fish, which contains 15-20% N of its dry weight. Beside being expensive (approximately US$ 800/ton), it can be a source for diseases and pollution. On the other hand, recycling local chicken manure for organic agriculture would reduce occurrences of odor nuisance, disease and environmental pollution. Layer and Broiler manures contain approximately 4% N; however, their low price (~US$ 25/ton) and availability can significantly reduce fertilization costs and environmental risks [Hadas A. The field 77 (1997) 18-20]. The most common practice for liquid N production in organic agriculture is to brew the manures in water at a ratio of 1/10 of dry manure/water for at least 10 d, as required by organic practice, forming an ammonia rich solution. The accepted guano extract contains, apart from the desired N, additional constituents, some of which can cause negative effects to the crop and to the environment (i.e. traces of hormones, excess nutrients, and pathogens). The extraction efficiency, in manure extracting, is usually about 10%. For most purposes, however, the preferred efficiency would be higher, and, furthermore, preferred form of N would be nitrate (ammonia is the dominant N source in the extracts). It is therefore an object of the invention to provide a process for the extraction of nitrogen from organic wastes, preferably manures, with improved N extraction efficiency.

It is another object of this invention to provide a method for the extraction of nitrogen from organic wastes and manures, comprising separating ammonia from the extract, and converting said ammonia to nitrate in a microbial process.

It is still another object of this invention to provide a method for the extraction of nitrogen from organic wastes and manures, comprising improving the fertilizer quality of the extract, and minimizing potential environmental pollution.

It is a further object of the invention to provide a nitrogen rich extract from fowl manure for use in organic agriculture.

Other objects and advantages of present invention will appear as description proceeds.

SUMMARY OF THE INVENTION

This invention provides a method for manufacturing a liquid nitrogen fertilizer from an organic waste, comprising the steps of i) extracting the waste in water, wherein an aqueous solution is obtained containing nitrogen essentially in form of ammonia; ii) volatilizing said ammonia; and iii) absorbing the volatilized ammonia in a liquid medium or solid medium. The method, in a preferred embodiment, further comprises converting at least a part of the absorbed ammonia to nitrate using nitrifying bacteria. Moist bio-solids (i.e. compost, vermiculite, zeolite), that may or may not be mixed with nitrifying bacteria or plastic beads coated with said bacteria, may advantageously serve for absorbing said volatilized ammonia. The volatilized ammonia may be thus absorbed on the soil surface and converted to nitrate. Said step of volatilizing may comprise adding a base or increasing the temperature, the volatilization may occur at least partially spontaneously. Said medium for absorbing the ammonia may be selected from aqueous solutions, bio-solid substances, and suitable sorbents. Said bio-solid substance may comprise compost or a manure; said sorbent may comprise plastic beads, vermiculite, zeolite, and the like. The nitrifying bacteria may be suspended or bound. In the method of the invention, said volatilizing occurs either consequently to said step of extracting or simultaneously with said step of extracting. Said liquid nitrogen fertilizer of the invention may be obtained by extracting said solid medium in water or water based liquid, such as an aqueous solution or suspension acceptable in agriculture. The method of the invention may further comprise extracting with water the nitrate created by the bacteria, thereby obtaining said liquid nitrogen fertilizer of the invention. Alternatively, said liquid medium after absorbing the volatilized ammonia may be used as the liquid nitrogen fertilizer of the invention. In any case, the method of the invention preferably provides a liquid fertilizer that has higher concentration of available nitrogen than said aqueous solution obtained by the first extraction of the waste. At least 25% of nitrogen initially present in the waste is obtained as available nitrogen. However, even 80% or more of nitrogen in the initial waste may be extracted and obtained in the fertilizer. Nitrogen is available as ammonia or nitrate. The extracting step is usually performed for more than two days, preferably comprising brewing performed for about four days or more. The method according to the invention enables extractions shorter than 14 days. In a preferred embodiment, the waste to be extracted comprises a fowl manure, such as Broiler manure, Layer manure, Guano, etc.

The invention relates to a method of manufacturing a liquid nitrogen fertilizer for organic agriculture, comprising the steps of i) extracting an organic waste in water, wherein a first aqueous solution is obtained containing nitrogen essentially in form of ammonia; ii) volatilizing said ammonia; iii) absorbing the volatilized ammonia in a second aqueous solution or in a solid matrix, said volatilization being assisted by increased temperature or by increased pH; and optionally iv) converting at least a part of ammonia to nitrate, using nitrifying bacteria. The step of extracting is preferably performed in a first reactor, and said step of converting the ammonia to nitrate is performed in a second reactor. The step of absorbing the ammonia may be performed in said second reactor. The nitrifying bacteria may be present in said second reactor, for example bound in a bio-solid substance or in a sorbent. Said method may further comprise extracting with water the nitrate formed in said second reactor, thereby obtaining said liquid nitrogen fertilizer for organic agriculture. The method according to the invention has a high extraction efficiency, and minimizes potential environmental pollution and health hazards. In a preferred embodiment of the method according to the invention, said organic waste is a fowl manure.

The invention further provides a liquid nitrogen fertilizer for organic agriculture obtained by extracting an organic waste, which fertilizer contains more than 2000 mg nitrogen per liter, and may contain more than 20,000 mg N/liter. Preferably the fertilizer of the invention contains 15,000 mg nitrogen per liter or more. Nitrogen may be comprised in ammonia or nitrate or their mixture.

BRIEF DESCRIPTION OF THE DRAWINGS

The above and other characteristics and advantages of the invention will be more readily apparent through the following examples, and with reference to the appended drawings, wherein:

FIG. 4. is a graph showing in 4A percentage of manure nitrogen and in 4B maximum nitrogen concentration extracted after 14 days in the different extraction protocols, the figures on top of the bars are the average pH values of the extract solution during the 14-day extraction;

FIG. 7. comprises Table 1 and Table 2.

DETAILED DESCRIPTION OF THE INVENTION

Figure 1:
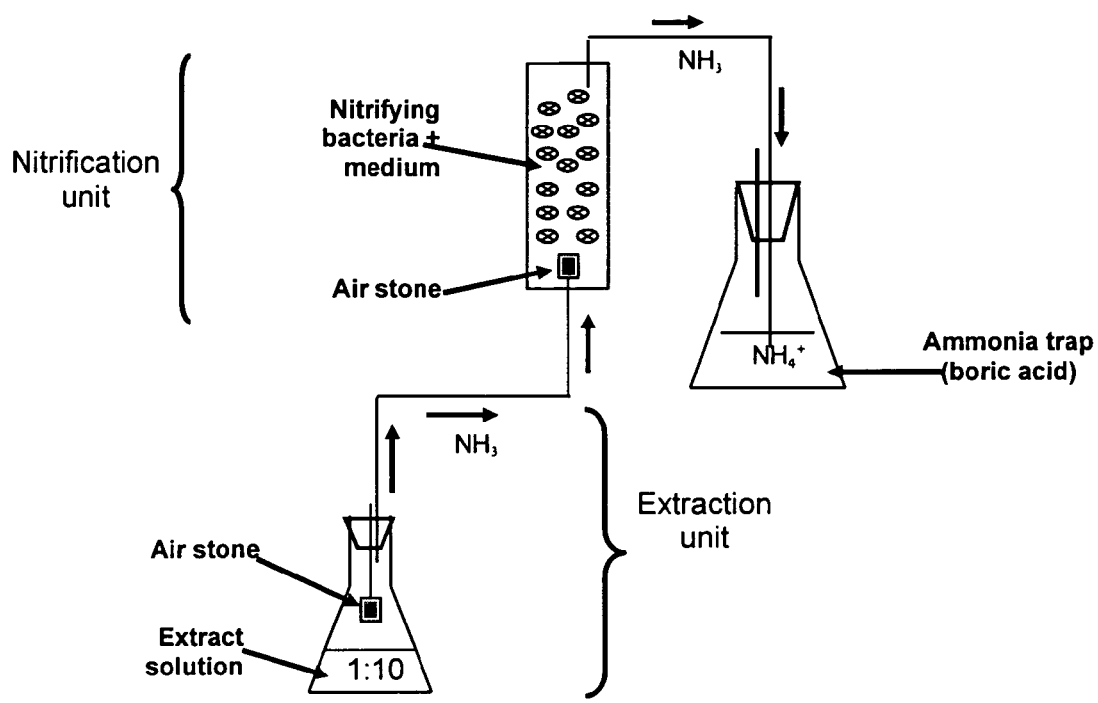
FIG. 1. Shows a method of manufacturing a liquid nitrogen fertilizer for organic agriculture, comprising the steps of i) extracting organic wastes and manures in water containing nitrogen essentially in form of ammonia; ii) volatilizing ammonia and absorbing it in a biological reactor composed of aqueous solution and a solid matrix; and iii) converting at least a part of the ammonia absorbed in the reactor to nitrate, using nitrifying bacteria.

The method of manufacturing a liquid nitrogen fertilizer for organic agriculture according to the invention is, in one embodiment, demonstrated in the figures. as comprising the steps of: i) extracting organic wastes and/or manures in water, wherein a first aqueous solution is obtained containing nitrogen essentially in form of ammonia (FIG. 1); ii) volatilizing said ammonia and absorbing it in a second aqueous solution or solid matrix (FIG. 2), said volatilization being assisted by an increased temperature or pH, or by air flux manipulations or all together; and optionally iii) converting at least a part of ammonia to nitrate, using nitrifying bacteria.

It has now been found that N rich extracts suitable for fertigation in organic agriculture may be obtained in a cheap process from organic wastes and specifically from fowl manure, comprising brewing the manure, volatilizing the formed ammonia, and optionally converting the ammonia to nitrate (nitrification). As an example, Guano, Layer and Broiler manures were extracted by different methods (see methods section) and the extracts were used as potential sources for rich liquid N. The average N content was about 18% for the Guano and 4% for the Layer and Broiler manures, similarly to the previous findings [Hadas A et al.: The field 71 (1991) 1539-44]. Most of the N in the manures is organic with considerable quantities of uric acid (Table 1). Uric acid concentrations in all liquid extractions were highest in the first couple of days and decreased to negligible concentrations for the rest of the extraction period. By the end of the extraction, after 14 d, all of the uric acid from the manures was virtually degraded in all of the extraction methods and manures. Uric acid nitrogen is degraded to ammonia. Ammonia was the major form of N in the extract solutions of all manures and in all methods as demonstrated in FIG. 3. Ammonia concentrations rose up to 10,782 mg/L, 1,653 mg/L, 4,645 mg/L in the passive extractions of Guano, Layer and Broiler manures, respectively. In all methods the dissolved oxygen during the first 10 days was less than 1 mg/L, suggesting that the organic matter degradation occurred under anaerobic conditions. The manure-N released after 14 days of extraction in the different methods ranged between 50% to 85% but did not differ among extraction methods except on 2 occasions (Guano airlift extraction and Layers MTBE), where the contact between the extract solutions and the manures was poor (FIG. 4a). Nevertheless, there were differences between methods in the TN (total nitrogen) concentrations in the extract solutions (FIG. 4b). Moreover, the TN concentrations observed in the extract solutions were always lower than the manures N that were released (FIG. 4b). The passive extraction was the most efficient and the manure-N released accounted for 84%, 85% and 53% of the initial manure-N concentration in Guano, Layer and Broiler manures, respectively. The maximum N found in the extract solutions of this method accounted only for 49% and 59% of the initial manure-N concentration in Guano and Layer manures, respectively. Comparing the passive extraction protocol that was found to be the most efficient in summer and in winter revealed significant differences in the manure-N released after 14 d. The average extract solution temperature in the summer was 30° C. and ranged from an average minimum of 23.5° C. to a maximum of 37° C. The average extract solution temperature in the winter was 17° C. and ranged from an average minimum of 13° C. to a maximum of 21° C. The winter manure-N released during 14 days extraction was 49%, 40% and 27% in the Guano, Layer and Broiler manures, respectively, as opposed to 84%, 85% and 53% in the summer extraction. Based on the maximal N extraction efficiencies we analyzed the cost of Guano, Layers and Broilers manure-N. A ton of extractable Guano manure-N in 1:10 ratio (w/v) would cost approximately $10,000, whereas a ton of extractable Broiler and Layer manures-N would cost only $1,000 (Table 1 in FIG. 7). Analysis of the extracts for other nutrients, minerals, organic matter and pathogens (see method section-Extraction of Fowl Manure Nitrogen), that can affect the plant growth or can have environmental and health impacts, is summarized in Table 2 (FIG. 7). Unlike N, additional nutrients P and K in the extracts are usually not required for growth as they are sufficiently supplied by the solid manure application. However, this might have cumulative harmful effects such as environmental contamination and imbalanced fertilization. The high concentrations of organic matter and TSS required filtration and special treatment for the irrigation system to prevent clogging and formation of biofilm. Pathogen analysis after 14 d's digestion of the different manures occasionally revealed presence of Clostridium and Salmonella species.

Figures 3A, 3B:
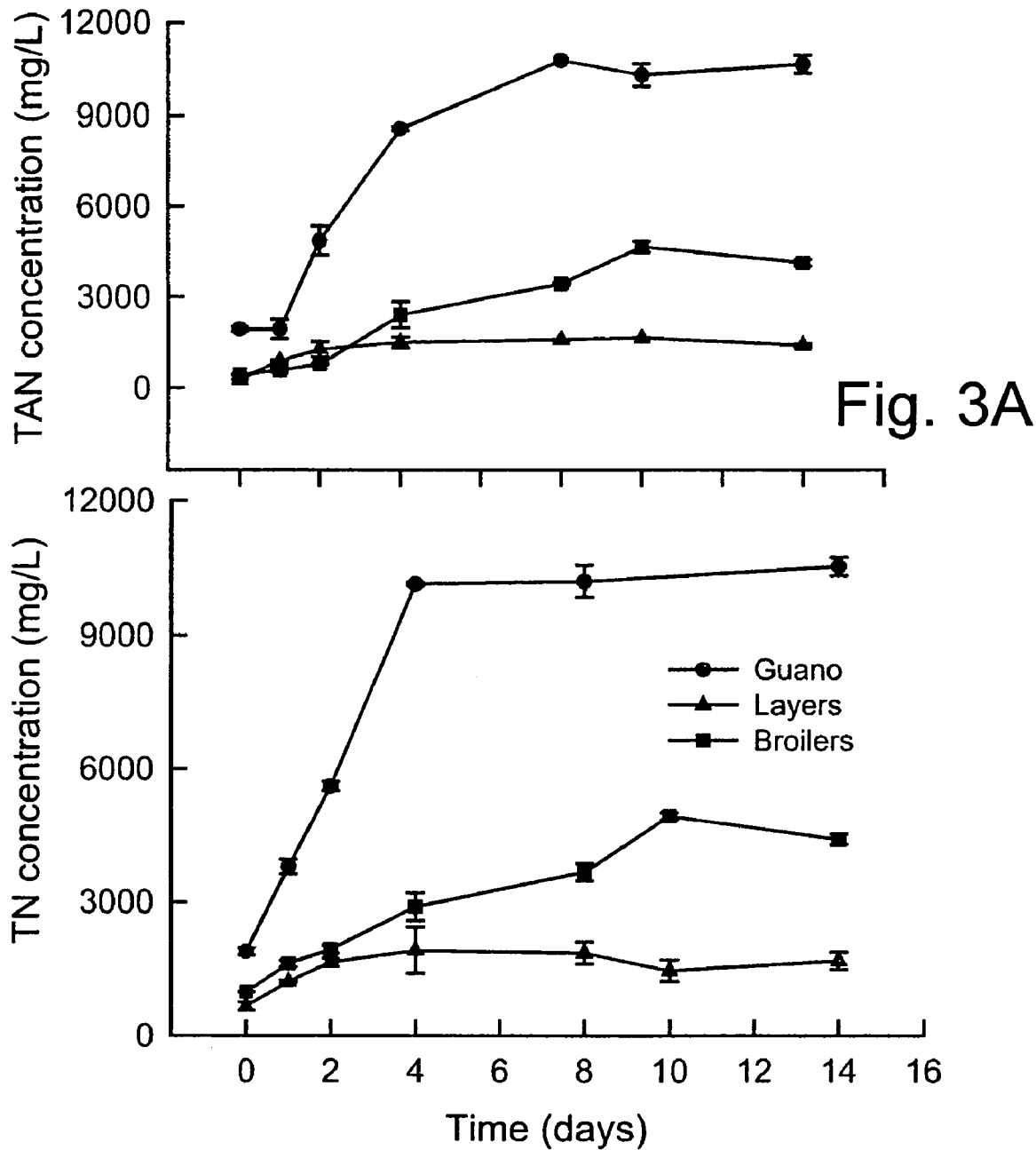
FIG. 3. demonstrates in 3A total nitrogen and in 3B total ammonia nitrogen concentrations versus time in the extract solutions in an embodiment of the passive extract protocol, the average value being based on 3 replicates.
Figure 5A:
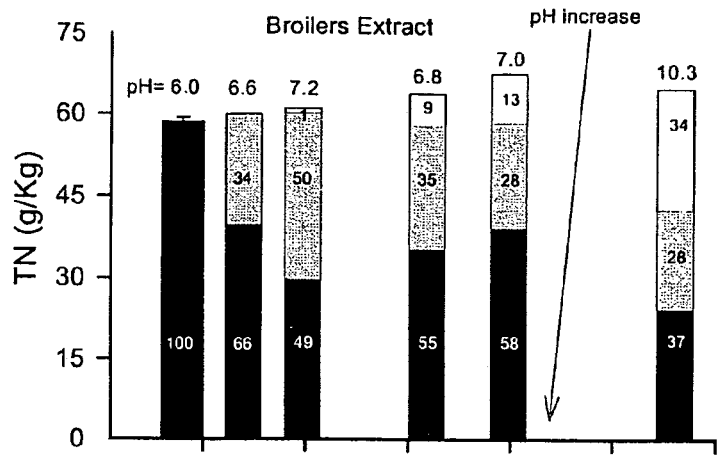
FIG. 5. is a graph showing in the fate of nitrogen extracted passively in a 1:10 manure:water ratio, over time (14 days), for Broiler in 5A, for Layer in 5B, and for Guano in 5C, the figures in the bars indicate the percentage of the nitrogen fraction, and the figures on top show the average pH of the extract solution.
Figure 5B:
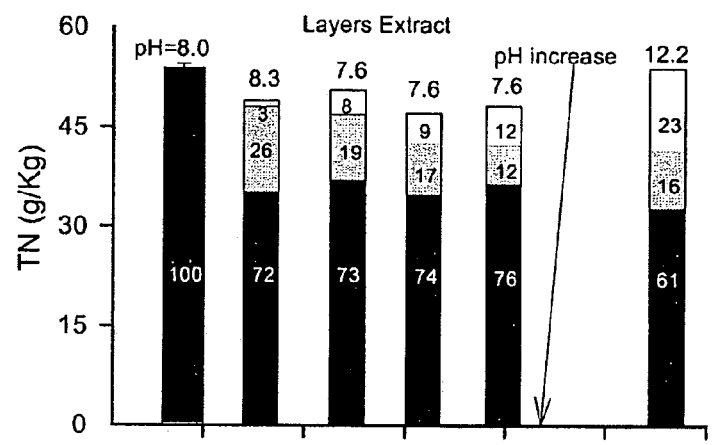
Figure 5C:
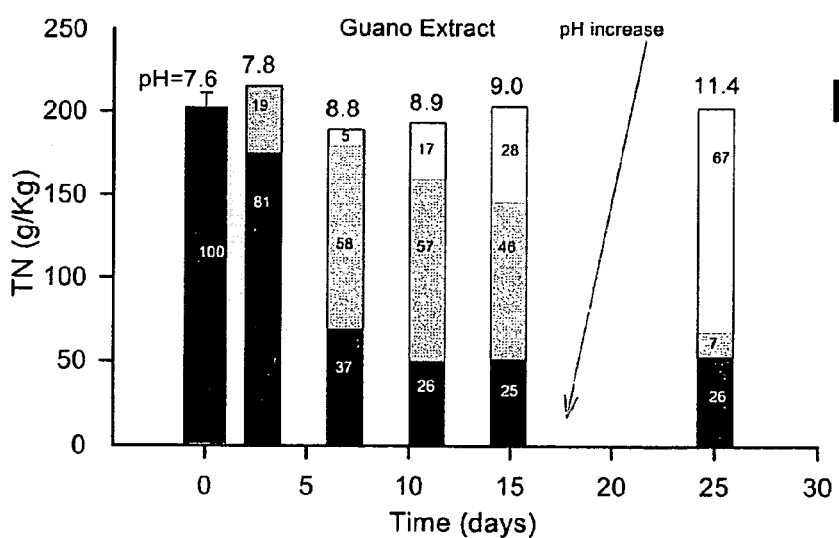

Ammonia-N exists in water as non-ionized $NH_3$ (ammonia) and $NH_4^+$ ions (ammonium) in a temperature/pH dependent equilibrium. Non-ionized ammonia is a dissolved gas subject to volatilization, and the proportion of ammonia relative to ammonium increases with increasing pH. Separation and entrapment of ammonia from the extract solution via volatilization can potentially increase the quantity of N available for fertigation since ammonia constitutes a significant fraction of the extract solution TN (over 80% in Broiler and Guano manures), as demonstrated in FIG. 3, and because it will recover losses due to volatilization that often occur from the extract solution (FIGS. 3 and 4). For example, when we tested the common extraction practice for Guano manure, about 75% of the manure-N was released to the extract solution, of which 37% volatilized, implying that it could not be recovered for fertilization (FIG. 5a). Significant losses of ammonia via volatilization were also demonstrated when Layer and Broiler manures were extracted using the common procedure and the other tested procedures (FIG. 5b, c and FIG. 4). It should be noted that the volatilization losses were smaller than in the Guano because of the lower extract solution pH. During the 14 d period 12% of the Layers manure-N was volatilized and 13% of the Broilers manure-N.

The artificial rise in pH after 14 d of extraction enhanced volatilization. In the case of Guano, about 67% of the manure-N volatilized, which is 89% of the manure-N that was mineralized to the extract solution (FIG. 5a). In the Layer and Broiler manures 23% and 34% were volatilized, respectively, following the increase of pH. Hence, 16% of the TN remained in the Layers extract solution and 28% in the Broilers extract solution, compared with 7% in the Guano extract solution (FIG. 5a, b, c). The lower volatilization efficiencies in the Broilers after raising the pH were attributed to the lower pH (average 10.3) of the extract. The introduction of lime should be practiced after most of the manure-N is released to the extract solution as it ceases microbial activity, or in other words the mineralization of organic N to ammonia. The time of extraction should be determined separately in different temperature ranges for the different manure sources. For example, the maximum TN concentration extracted from the Layers manure in laboratory conditions occurred after 2 days (35% from the initial TN concentration).

The nitrification unit was designed to fix the non-ionized ammonia by its conversion to ammonium ion followed by its oxidation to nitrate (nitrification). The nitrification was carried out by nitrifying bacteria that were isolated from the Negev desert soils (Israel) and pre-coated on "Aridal-Bioball" plastic media [Gross A. et al.: Aquaculture 223 (2003) 51-62]. Ammonia is a base, which raises the water pH because it consumes hydrogen ions according to the following equilibrium equation (Eq. 1):

$$NH_3 + H^+ = NH_4^+$$

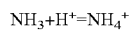 Eq. 1.

Nitrification reduces pH as it releases 2 moles of hydrogen ions per mole of nitrified ammonium (as summarized in Eq. 2).

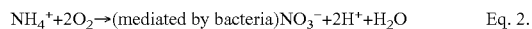 Eq. 2.

Figure 6:
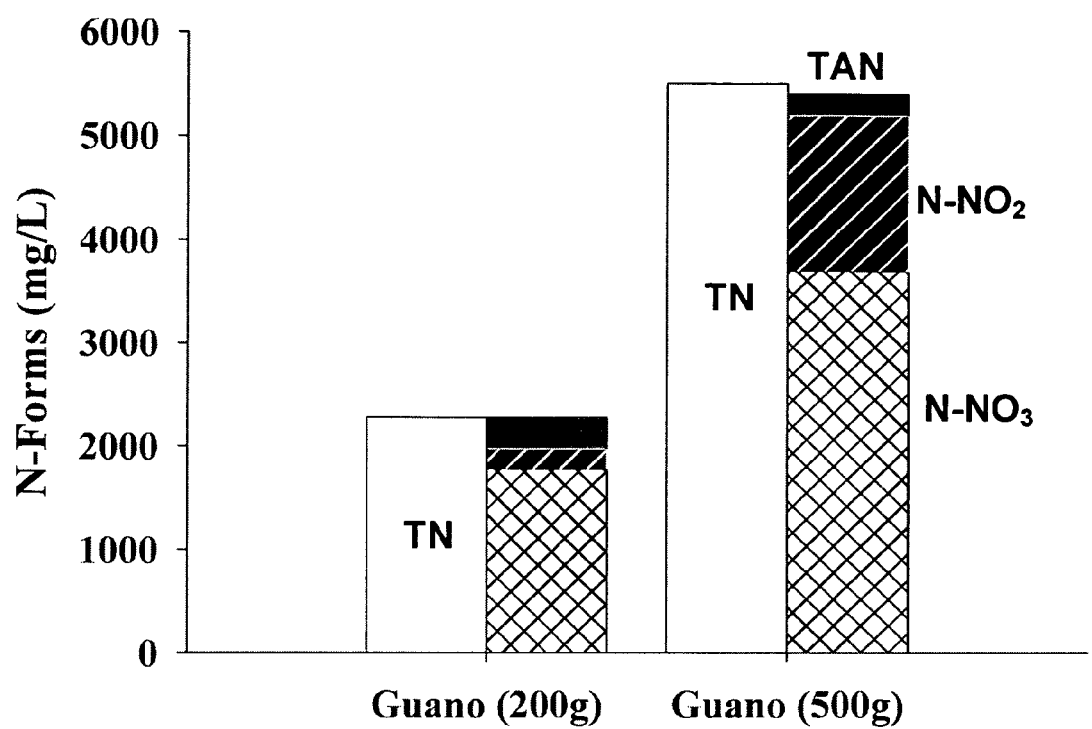
FIG. 6. shows an example of the nitrogen concentrations in the nitrification unit medium that was attached to 200 and 500 g of guano passive extraction units.

Ammonia was entrapped and then underwent nitrification. Optimal temperature of 25° C.±2.5° C. was maintained for nitrification. An example of the conversion efficiency in the nitrification unit is demonstrated in FIG. 6. Even though nitrite was found in lower concentrations than ammonia and nitrate, attention should be paid to accumulation of nitrite, which might be harmful. Our results show that it is possible to convert the volatilized ammonia to nitrate rich solution. Suitable ammonia flow rate into the nitrification unit, nitrification rate, pH, temperature, and buffering capacity of the medium are factors affecting the extraction efficiency, and ammonia losses in the unit. A skilled person will thus maximize nitrification and minimize nitrite accumulation.

Thus, the invention provides supplementary N side dressing for the irrigation system, needed in organic cropping. The invention provides a method improving the N extraction efficiency high above the usual value of about 10%. The efficiency of the extraction was, in various embodiments, comprised ammonia, ranging typically from 50% to 85%.

It can be concluded that, according to the invention, passive extraction with few mixes a day is sufficient to extract N from fowl manures. Nitrogen is separated the from the extract solutions to enable better fertigation with less environmental and health risks. The method of the invention may lower the minimal times usually required by organic regulations for extracting, 10-14 d, since no potentially dangerous chemicals are involved. The ammonia volatilization practice is more efficient than the common practice. Ammonia may be trapped in a solution, which can be used directly as a fertilizer, or preferably ammonia is first nitrified. Ammonia may be trapped in a solid matrix which will require another step of water extraction of the reactor for retrieving the nitrogen rich fertilizer. Nitrification of the trapped ammonia will improve the fertilizer quality. A skilled user of the invention will adjust the precise factors, such as the dimensions of the extraction and nitrification units, to her/his concrete conditions, type of manure, etc. Preferably Layer and Broiler manures are utilized.

EXAMPLES

Methods

Extraction of Fowl Manure Nitrogen

Guano, Broiler and Layer manures were used as the source material for extraction of N in freshwater for organic fertigation. A 1:10 (w/v) ratio of manure:water was used based on previous findings [Hadas A. & Rosenberg R.: Fert. Res. 31 (1992) 209-14]. In all set-ups an equivalent weight of 3 Kg dry manure was used with 30 L of freshwater. Four different extraction protocols differing in their aeration and mixing combinations were tested as follows: a) passive extraction, in which the extract solution was mixed twice a day for about 2 minutes; b) active extraction, in which the extract solution was continuously and rigorously mixed with an air jet; c) airlift extraction, in which the extract solution was gently mixed and aerated with simple airlift; and d) manure tea brewer extraction (MTBE), in which the manure and extract solution were separated from each other. The extract solution was pumped repeatedly from a collecting reservoir on the manure pile that was located in a perforated container above the reservoir. The solution was then trickled down through the manure back to the collecting reservoir. The experiments were conducted between June and September in a greenhouse and the temperature was monitored. In order to reduce differences between source materials in the experiments, fresh manures from the same farm were used in all experiments except for Guano that is imported. The percentage moisture in the manures was determined before each experiment by drying at 105° C. and the weights were corrected accordingly to maintain a ratio of 1:10 (manure:water). All treatments were performed in triplicate. The pH and dissolved oxygen (DO) were measured twice a day (morning, and afternoon) by multimeter 340i (WTW, Germany). Samples from the extraction solution were taken on days: 0, 1, 2, 4, 6, 8, 10, 12 and 14 and filtered in a GF-AE Gellman filter. The filters were used for the determination of total suspended solids (TSS). The filtrates were analysed for: ammonia-N by distillation to boric acid followed by titration; nitrite and nitrate by using the RQ Flex kit (Merck, Germany); uric acid by using a uric acid analysis kit (Sigma, USA); total nitrogen (TN) and total phosphorous (TP) by persulphate digestion followed by the UV spectrophotometric method for N analysis and the vanadomolybdate method for P analysis. Potassium was analyzed by flame atomic absorption spectrometry (Perkins Elmer 1100B), and electrical conductivity by a multimeter 340i (WTW, Germany). All analyses followed standard methods [American public health association/American water works association/Water environment federation. Standard Methods for the Examination of Water and Wastewater. 20th edition, Washington D.C., USA. 1998.], unless stated otherwise. Manure samples were taken before and after each experiment and were analyzed for: organic matter by the gravimetric method; TN by the Kjeldahl method; ammonia nitrite and nitrate by extraction in 2M KCl followed by the analytical procedures mentioned above. Representative samples from the original manures and extractions were sent for pathogen analysis.

Entrapment of Volatilized Ammonia

Collecting of volatilized ammonia nitrogen from the Guano, Broilers and Layers manure extracts, during a 14 d digestion, was studied. Ammonia from the extract solution was collected after a pH increase (at the end of the extraction period). The pH was raised with burnt lime, which is permitted in organic practice. Into each of nine 500 mL Erlenmeyer flasks an equivalent of 30 g dry manure (Guano, Layers or Broilers) and 300 mL of tap water were mixed. The Erlenmeyer flasks were capped with two-hole rubber stoppers into which 5-mm diameter pieces of plastic tubing were inserted. The free end of the first tube was connected to an air pump (via humidifier) and the free end of the other tube was submerged in 4% boric acid to trap volatilized $NH_3$ gas. In order to prevent losses from the trap a second trap was attached to the first one. Both traps had indicators, and once there was indication of ammonia in the second trap the boric acid was replaced. Three Erlenmeyer flasks were used as controls and contained tap water instead of manure solution. Room temperature was 25° C.±2.5° C. The Erlenmeyer flasks were mixed twice a day. The manure and supernatant were sampled on the first and second days and thereafter every second day for 14 d. Liquid samples were analyzed for TN by persulfate digestion following UV spectrophotometric analysis. Manure samples were subdivided: one sample was analysed for moisture content and the other portion was tested for TN by the Kjeldahl method. Boric acid traps were replaced as needed according to the colour of the indicator, usually once or twice a day and their ammonia concentration was determined by titration with sulfuric acid. By the end of a 14 d passive extraction, the pH was increased by addition of burnt lime to above 12 and the experiment continued for another 10 d, at which point no further significant volatilization in the boric acid traps could be detected.

Ammonia Oxidation to Nitrate

Figure 2:
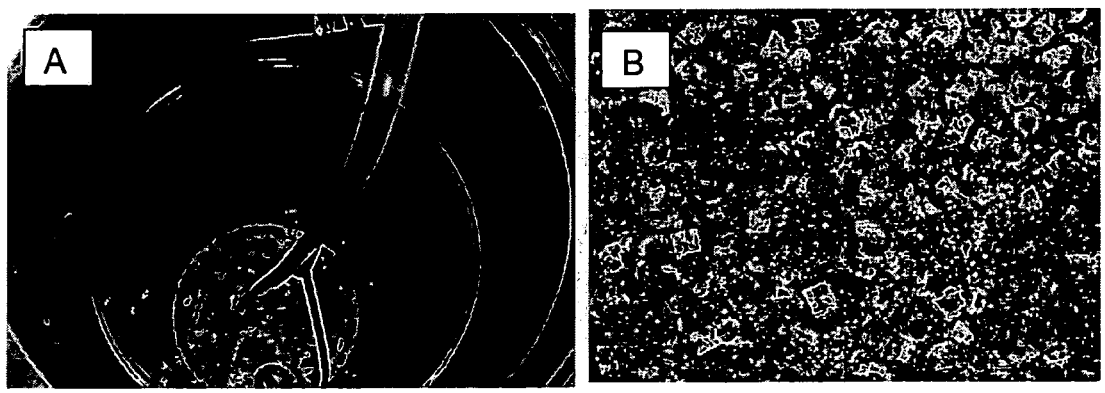
FIG. 2. demonstrates 2 configurations of the nitrification unit (biological reactor): A) aqueous solution with plastic beads pre-coated with nitrifying bacteria; B) moist compost mixed with plastic beads at a 1:1 ratio.

A laboratory set-up (nitrification unit) was designed to trap volatilized ammonia from an extraction unit and oxidize it to nitrate as shown in FIG. 1. The Guano and Broiler extraction units were similar to the ones used in the volatilization study. Instead of directly trapping the ammonia in boric acid, it was diverted to the nitrification unit that was composed of a column corked with rubber stopper at both ends into which 5-mm diameter pieces of plastic tubing were inserted. At the bottom end one hole was connected to the airflow coming from the extraction unit. In order to enhance ammonia dissolution in water the air flowed via a fine air stone that reduced the size of the air bubbles. At the upper end one hole was submerged in 4% boric acid to trap any $NH_3$ gas escaping from the nitrifying unit. The column was filled with a 1 to 1 mixture compost and "Aridal bio-balls" plastic media (Aridal, Cfar Hasidim, Israel). Samples of manures and extractions were taken after 1, 4, 8, 11 and 14 days and were analysed for TN and ammonia-N as described previously. The pH of the extractions was monitored routinely. The manures were analysed for TN on the same dates of the extract solution as described previously.

While the invention has been described using some specific examples, many modifications and variations are possible. It is therefore understood that the invention is not intended to be limited in any way, other than by the scope of the appended claims.

The invention claimed is:

1. A method of manufacturing a liquid nitrogen fertilizer from a fowl manure organic waste, comprising the steps of
    extracting the waste in water under aerated conditions, wherein an aqueous solution is obtained containing nitrogen essentially in form of ammonia;
    volatilizing said ammonia; and
    absorbing the volatilized ammonia in either (1) a liquid medium, or (2) a solid medium, and further extracting said solid medium in water or water based liquid.

2. A method according to claim 1, further comprising converting at least a part of the absorbed ammonia to nitrate using nitrifying bacteria.

3. A method according to claim 1, wherein said step of volatilizing further comprises adding a base or increasing the temperature.

4. A method according to claim 1, wherein said volatilizing occurs at least partially spontaneously.

5. A method according to claim 1, wherein said medium is selected from the group consisting of an aqueous solution, a bio-solid substance, and a sorbent.

6. A method according to claim 5, wherein said bio-solid substance comprises compost or a manure.

7. A method according to claim 5, wherein said sorbent is selected from the group consisting of plastic beads, vermiculite, and zeolite.

8. A method according to claim 2, wherein said bacteria are suspended in a liquid or bound onto a solid surface.

9. A method according to claim 1, wherein said volatilizing occurs either consequently to said step of extracting or simultaneously with said step of extracting.

10. A method according to claim 2, further comprising extracting said nitrate in water, thereby obtaining said liquid nitrogen fertilizer.

11. A method according to claim 1, wherein said liquid medium is used as said liquid nitrogen fertilizer.

12. A method according to claim 1, wherein said fertilizer has higher concentration of available nitrogen than said aqueous solution obtained by said extracting.

13. A method according to claim 1, wherein at least 25% of nitrogen initially present in the waste is extracted and obtained as available nitrogen.

14. A method according to claim 13, wherein said nitrogen is available as ammonia or nitrate.

15. A method according to claim 1, wherein said manure is selected from the group consisting of Broiler manure, Layer manure, and Guano.

16. A method according to claim 1, wherein said extraction comprises brewing performed for about four days or more.

17. A method of manufacturing a liquid nitrogen fertilizer for organic agriculture, comprising the steps of extracting a fowl manure organic waste in water under aerated conditions, wherein a first aqueous solution is obtained containing nitrogen essentially in the form of ammonia;

volatilizing said ammonia, the volatilization being assisted by increased temperature or by increased pH;

absorbing the volatilized ammonia in either (1) a second aqueous solution or (2) a solid matrix, and further extracting said solid matrix in water, and optionally converting at least a part of ammonia to nitrate, using nitrifying bacteria.

18. A method according to claim 17, wherein said step of extracting is performed in a first reactor, and said step of converting the ammonia to nitrate is performed in a second reactor.

19. A method according to claim 18, wherein said step of absorbing the volatilized ammonia is performed in said second reactor.

20. A method according to claim 18, wherein said second reactor comprises nitrifying bacteria bound in a bio-solid substance or in a sorbent.

* * * * *